Sept. 23, 1952   L. E. MAY   2,611,561
CENTERING MECHANISM FOR AIRCRAFT CONTROLS
Filed April 20, 1948   2 SHEETS—SHEET 1

LaVerne E. May
*INVENTOR.*

BY James M. Clark
HIS PATENT ATTORNEY

Sept. 23, 1952 L. E. MAY 2,611,561
CENTERING MECHANISM FOR AIRCRAFT CONTROLS
Filed April 20, 1948 2 SHEETS—SHEET 2
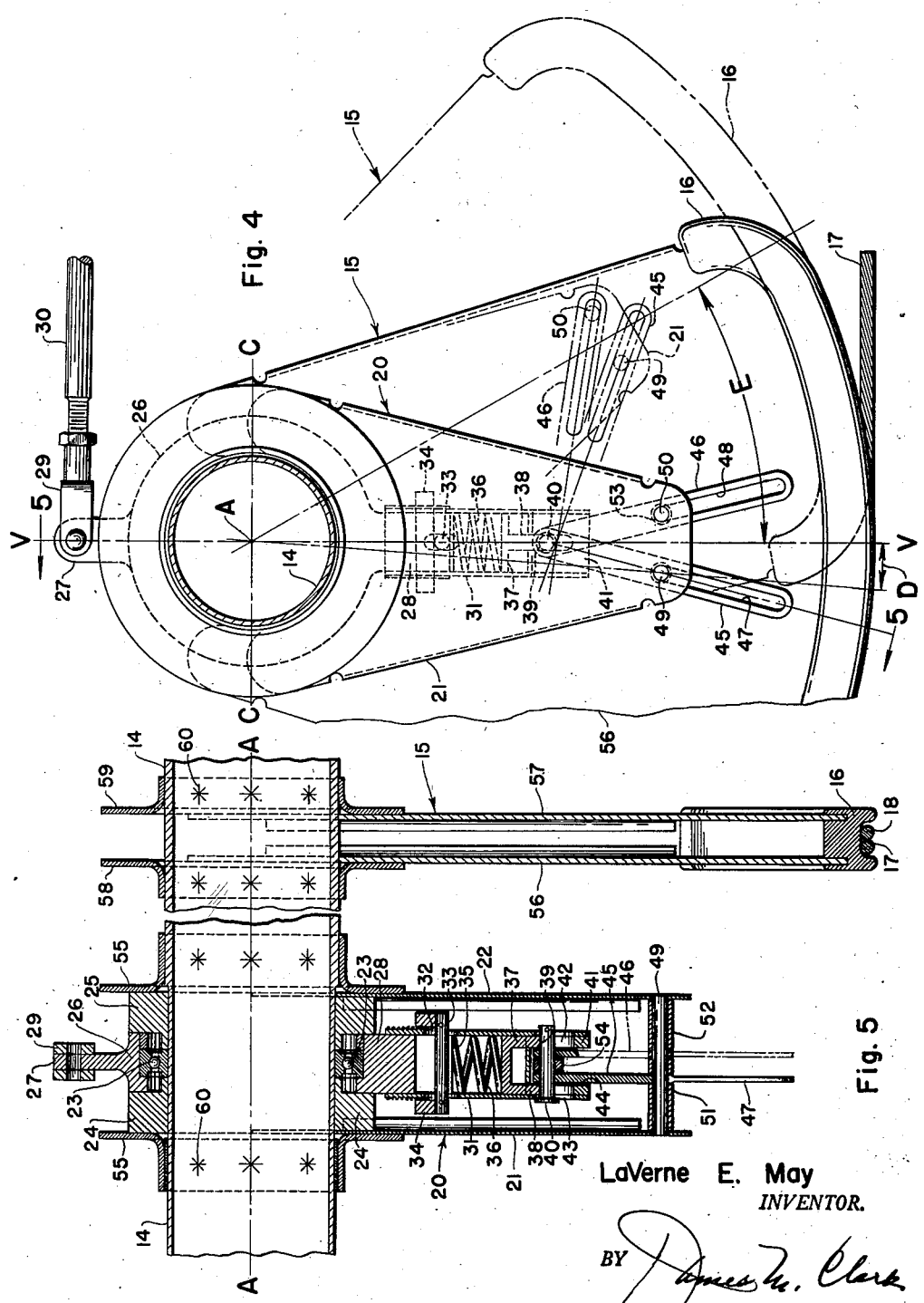
LaVerne E. May
INVENTOR.
BY *James M. Clark*
HIS PATENT ATTORNEY Patented Sept. 23, 1952

2,611,561

UNITED STATES PATENT OFFICE 2,611,561

CENTERING MECHANISM FOR AIRCRAFT CONTROLS

La Verne E. May, San Diego, Calif., assignor to Consolidated Vultee Aircraft Corporation Application April 20, 1948, Serial No. 22,109

17 Claims. (Cl. 244—83)

The present invention relates to controls for aircraft, and more particularly to improved means for centering and returning such controls to predetermined neutral positions, and for assisting in maintaining said positions.

Under optimum flight conditions, the control surfaces of the airplane are designed to be in their neutral positions, but due to varying conditions which occur in flight, it is necessary to adjust these control surfaces frequently as a result of changes in trim position due to variation in loading, power plant and propeller adjustments, gusts and for numerous other reasons. During these flight conditions and particularly in maneuvers, the trim settings are frequently disturbed by the wide range of angular motion of the control surfaces, and the latter do not always return to their predetermined neutral or trim positions due to the frictional resistance within the control system, and for a number of other reasons.

It has previously been suggested that suitable means, such as spring or other resilient devices, be provided to return and maintain the control surfaces and their associated operating mechanism in the neutral or centered position. Such devices have been employed in aircraft for centering the controls for the ailerons, elevators and rudders, and in a typical installation for use with the rudder the centering spring is compressed by a foot pedal during manipulation of the rudder pedals. This and other prior devices have, however, proven objectionable and unsatisfactory, particularly from the standpoint that the forces or energy stored in these springs are added to the wind resistance encountered by the deflected rudder and greatly hamper movement of the controls, thereby adding to the stick forces and to the fatigue of the pilot.

It is, accordingly, a major object of the present invention to provide an improved device for returning the control surfaces—which are displaced from their correct trim position during flight conditions and maneuvers—to their original or predetermined settings. It is a further object to provide an improved follow-up centering means for the control surfaces of aircraft which will assist the pilot in returning these surfaces to their predetermined neutral positions and relieve him of the task of manually retaining them in this relationship. It is a further object of this invention to provide an improved centering device which is adapted for use in operating the various control surfaces of aircraft and which is applicable to the ailerons, elevators and rudders, whether or not these surfaces are provided with tabs or other auxiliary surfaces.

It is also an object of the present invention to provide a centering device for aircraft control surfaces, which is operated by a spring or other resilient means when the parts thereof are moved to a predetermined neutral position and which yieldingly maintains the parts in this relationship without the aid or attention of the pilot. A further object resides in the provision of an improved centering device in which the centering spring or other means is rendered inoperative as the parts are actuated to tilt the control surface from its normal trim position to thereby reduce the stick force necessary to operate the control surface; and which centering means is operative, when the manual control means approaches its original setting, to automatically and accurately return the control surface and its associated operating mechanism to their predetermined trim position.

It is also an object to provide an improved centering device in which the position of the centering means may be shifted or relocated at the convenience of the pilot in accordance with changes made necessary in the normal trim position of the control surface to thereby maintain the equilibrium of the respective parts in the neutral position regardless of the readjusted trim setting. It is a still further object to provide an improved device which is simple in construction and positive in operation in performing its intended functions. Other objects and advantages of the present invention will become apparent to those skilled in the art after reading the following description, taken together with the accompanying drawings, in which:

Fig. 4 is an enlarged detail view of the centering device and control quadrant shown in Figs. 1 and 2; and Fig. 5 is a cross-sectional view taken along the line 5—5 of Fig. 4.

Figure 1:
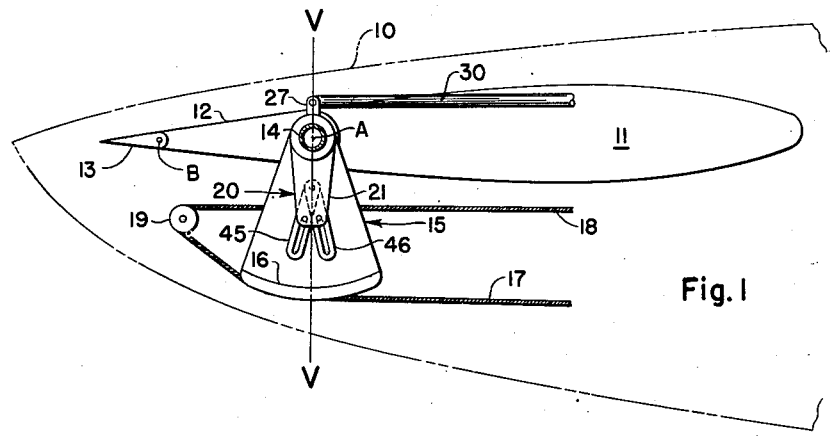
Fig. 1 is an elevational view of the tail portion of an airplane showing the horizontal tail surfaces to which the improved centering device of this invention are shown applied.
Figure 2:
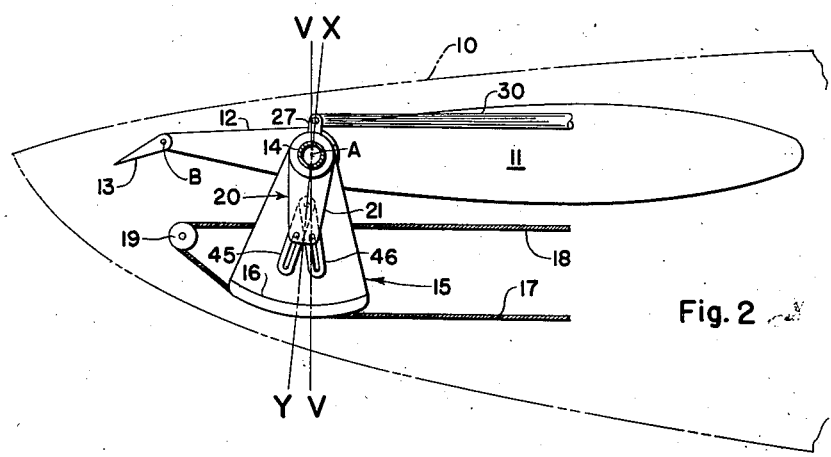
Fig. 2 is a similar elevational view of the elements shown in Fig. 1 with the elevator, tab and centering device deflected into an adjusted position.

Referring now to Figs. 1 and 2, the numeral 10 represents the tail portion of the fuselage of an airplane on which there is mounted the fixed horizontal stabilizer or tail surface 11. At the trailing edge of the stabilizer there is adjustably mounted the elevator 12 at the trailing portion of which there is also pivotally mounted a trim tab 13. The elevator 12 is fixedly attached to the operating shaft or torque tube 14 which is suitably journaled within the aircraft structure for rotation about its transverse axis A. The tab 13 is mounted for rotation about its pivot B and the purposes and manner of operation of an elevator tab such as 13 are well known in the art and will not be herein described in greater detail.

For purposes of control movements of the elevator 12, which is fixedly attached to the torque tube 14, there is also fixedly attached to the torque tube a control lever or quadrant 15 having an arcuate grooved face or edge portion 16 within which are anchored the control cables 17 and 18. These cables extend fore and aft with respect to the lever 15, the cable 17 extending directly forwardly and the cable 18 extending first rearwardly around the sheave 19 and then forward where it is attached, together with the cable 17 to the control column or other control device in the pilot compartment of the airplane. The latter mechanism is also well known in the art and it will also be understood that the application of forward stick force or pilot pull on cable 17 will cause downward deflection or rotation of the elevator 12, and that forward pull on the cable 18 in Fig. 1 will cause the quadrant 15 and the attached elevator 12 to be rotated into the "up" position as indicated in Fig. 2.

There is also secured to the torque tube 14, axially spaced from the quadrant 15, a pair of spaced lever arms constituting the side walls of the casing for partially enclosing the improved centering assembly 20. The details of this centering assembly may be more clearly seen in Figs. 4 and 5 in which it will be noted that the side arms or plates of the assembly are formed by the flanged sheets 21 and 22 which are axially spaced along the torque shaft 14 with the ball bearing 23 spaced therebetween. The ball bearing 23 is spaced from the arms 21 and 22 by the collars 24 and 25, an annulus or ring member 26 is rockably mounted on the ball bearing 23, and is provided with an upstanding ear or lug 27 and a downwardly extending or depending stem portion 28. The ear or lug 27 is apertured to be engaged by the terminal clevis 29 of a push-pull adjusting rod 30 by means of which the ring member 26 may be adjustably positioned, in the rotative sense, around the longitudinal axis A—A with respect to the fixed stabilizer portion 11. A sleeve or cylinder element 31 is fixedly fitted over the cylindrical end of the depending stem portion 28 of the ring member 26 and this sleeve 31 has aligned slots 32 in its opposite walls through which there is extended the transverse pin 33. The upper end of the sleeve 31 is externally threaded to engage the internally threaded adjusting ring 34, which serves to define the upper limit of movement of the pin 33 which is otherwise free to move up and down in the vertically disposed slots 32.

Engaging the lower side of the pin 33 is a washer 35 and disposed between this washer and a disc member 37 there is a compressed coil spring 36. The disc member 37 has a depending or lower extension portion 38 which is recessed at its lower end at 39 to engage a further transverse pin 40. A plug member 41 is fastened within the lower end of the cylinder 31 and is provided with a pair of slots 42 for the vertical movement of the pin 40, as well as the depending portion 38 of the disc member 37 disposed above the pin 40. The adjacent wall portions of the sleeve member 31 are also slotted at 43 to permit this vertical movement of the pin 40. It will accordingly be seen that the lower plug member 41 is provided with slots 42 to guide both the depending portions 38 of the disc member 37, as well as the pin 40, in a vertical direction as viewed in Figs. 4 and 5, or in the axial direction with respect to the cylindrical sleeve member 31. The plug member 41 is also provided with a transverse slot 44 in its lower end arranged at right angles to the upper slots 42, which lower slots are included to provide clearance for a linkage assembly about to be described.

A pair of articulated arms 45 and 46 are apertured at their upper terminals for common pivotal engagement by the transverse pin 40 and and are provided with elongated slots within their lower portions as indicated in Fig. 4 by the numerals 47 and 48. Adjacent the lower terminals of the side arms or plates 21 and 22 they are provided with the spaced pins 49 and 50 which extend between the plates 21 and 22 and have their end portions anchored therein. The pin 49 extends through the elongated slot 47 in the arm 45, and the pin 50 similarly extends through the corresponding slot 48 in the arm 46, in such manner that with the upper terminals of the arms 45 and 46 engaging the same pin 40, these articulated arms form an inverted V with their apex portion at the common pin 40 continually urged by the spring 30 in the downward direction away from the axis A of the torque tube 14. The pin 49 is provided with bushings 51 and 52 on the opposite sides of the arm 45, and the pin 50 is provided with a similar set of bushings 53 on either side of the corresponding arm 46. Between the arms 45 and 46, there is disposed an apertured spacing ring or washer 54 which serves to cooperate with the bushings 51 and 52 on pin 49, and the similar set of bushings 53 on pin 50. This maintains the arms 45 and 46 within planes parallel to the side plates 21 and 22 during all relative positions into which they may be placed by vertical movement of the pin 40 at the apex of the triangle formed by these articulated arms, and of which the spaced pins 49 and 50 form the base.

As clearly shown in Fig. 5, the cable quadrant 15 and the centering assembly 20 may be adjacently spaced with respect to each other along the axis of the torque tube 14 and fixed to their respective positions on the torque tube. The centering assembly 20 may be fixed to the torque tube by means of the flanged collars 55, which are fixedly attached to the side plates 21 and 22, as well as to the collars 24 and 25, and may be welded as at 60 to the torque tube 14. The control surface actuating sector 15 is similarly comprised of the segmental shaped side plates 56 and 57, which are connected at their outer edges to the cable groove member 16, and at their upper or inner ends to the similar and oppositely disposed flanged collars 58 and 59, which may also be welded as at 60, or otherwise fixedly attached to the torque tube 14.

Under certain operating conditions it may become necessary to adjust the trim position of the elevator 12 and its trailing edge tab 13 from the normal or neutral position shown in Fig. 1 to another position such as that which is indicated in Fig. 2. In other words it may be necessary to adjust the elevator 12 upwardly, and its tab 13 downwardly, from the neutral position of Fig. 1 in which the control sector 15 and the centering assembly 20 are both vertically disposed along the vertical axis V—V to the position shown in Fig. 2 in which the control sector 15 is rotated in a clockwise direction such that it is centered along the inclined axis X—Y. This is accomplished by forward pull on the control cable 18 extending around the sheave 19 and which pulls the sector 15 rearwardly from the V—V position to the X—Y position. In the event this new trim position is to be maintained for some time, and its becomes desirable that control movements away from the position shown in Fig. 2 be returned to this position, the centering means 20 is then similarly rotated in a clockwise direction by manual operation from the pilot compartment through suitable control mechanism (not shown) which is connected to the push-pull rod 30, causing the same to move forwardly the desired extent to rotate the centering assembly into the position in which it also coincides with the new centering axis X—Y. It will be understood that the operation of the centering means about to be described will serve to restore the elevator 12 to either its normal position as shown in Fig. 1 or to the trimmed position shown in Fig. 2, or to any other position into which it may be adjusted and to which the centering assembly 20 has also been adjusted and centered as indicated in Figs. 1 and 2.

Let us assume that the aircraft is flying a level course and that flying conditions are such that it is necessary to maintain the elevator 12 and its trim tab 13 in horizontal alignment and in their respective neutral positions as indicated in Fig. 1. It will be understood that the pilot can adjust these surfaces into this position by moving the control column fore and aft and operating the trim tab control to establish the proper setting of the surfaces 12 and 13. With these movable elevator and tab surfaces 12 and 13 thus adjusted, or in the neutral position of Fig. 1, a line bi-secting the angular quadrant 15, or its neutral axis or center-line, will be vertically positioned in coincidence with the reference line V—V in Fig. 1. In order to center the control surfaces in this relationship it is necessary, as indicated above, that the axis of the centering spring 36 and its surrounding sleeve 31, coincide with the line V—V, and this may be accomplished by tilting or rotating the annulus or ring member 26 by the remote control mechanism which is attached to the push-pull rod 30 for the adjustment of this ring member which controls the angle at which the sleeve 31 and the spring 36 are disposed about the axis A of the torque tube 14. With the quadrant 15 and the cylinder 31 thus adjusted angularly the centering spring 36, acting between the fixed washer 35 and the slidable disc element 37, will tend to force the latter, together with the lower pin 40 and the centering arms 45 and 46, downwardly spreading the lower ends of the centering arms outwardly as influenced by the spaced pins 49 and 50, this downward movement being limited by engagement of the pins 49 and 50 with the upper ends of the slots 47 and 48. Due to the fact that the force of the spring 36 is applied on a line bi-secting the angle of the articulated centering arms 45 and 46, the spring tends to spread them apart at their lower ends, but since they are prevented from swinging outwardly by the pins 49 and 50 they are stabilized or maintained in equilibrium.

During the continued flight of the airplane, when it is desired to ascend or descend, the quadrant 15 and the torque tube 14 are rotated in the desired direction by means of the pilot's control column. At the start of a rocking movement of the control surface, and corresponding movement of the side plates 21 and 22 from the centered position V—V toward the right or counter-clockwise as viewed in Fig. 4, the spring 36 will be further compressed by the left hand arm 45 as the latter approaches alignment with the fixed axis V—V of the spring 36 and its enclosing cylinder 31. Should the control column be released at this juncture the force of the compressed spring 36, (as long as the center of the pin 40 has not passed beyond the line connecting the center of the pin 49 and the axis A of the torque tube 14,) will cause the parts to be returned to their initial centered position symmetrical about the line V—V. When this arm 45 is, however, moved beyond the centerline V—V, at which the apex pivot pin 40 moves beyond the line connecting the pin 49 with the torque tube axis A (or beyond the extent of the angle D), the spring 36 acting against the apex pin 40 will aid the pilot in his forward pull on the control quadrant 15 to the cable 17. Eventually the force of the spring 36 will be expended and thereafter the pilot will continue to operate the elevator against wind resistance. This condition would exist in the position of the elevator 12 corresponding to that of the control quandrant 15 as shown in the construction lines in Fig. 4, in which the side plates as represented by the plate 21, also in construction lines in this figure, have been rotated to the right or counter-clockwise into a position in which the lower spaced pins 49 and 50 are disposed within the lower portions of the slots 47 and 48 of the respective articulated arms 45 and 46. In this position these arms do not have the effect of transmitting any of the compressive force of the spring 36 into either of these arms to the side plates 21. The spring 36 is accordingly said to be expended, as far as its centering effect is concerned, and the pin 40 will accordingly be moved by the spring to its lower or farthest position within the slots 42 and 43, or outwardly with respect to the center A of the torque tube 14.

Figure 3:
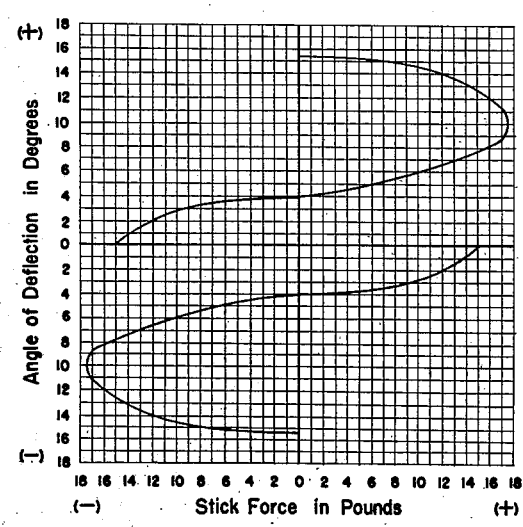
Fig. 3 is a graphic representation of the angular extent and magnitude of the stick forces applicable to the centering device shown in Figs. 1 and 2.

In Fig. 3 there is indicated graphically an example of the stick force necessary to overcome the force of the spring 36 and the wind resistance when operating the elevator during flight maneuvers. Although the pivots 49 and 50 are shown in Fig. 4, (with which the graph in Fig. 3 corresponds, as located on radial lines spaced approximately 4 degrees on either side of the center-line V—V, and as represented by the angular deflection D), this angular relationship may be varied in accordance with the operating requirements of the particular control surface. As the elevator is returned to its initial setting and it approaches the neutral position, the arms 45 and 46 will again act to compress the spring 36 such that when the left hand arm 45 moves to the left of the axis V—V of the spring 36 the latter will automatically continue this movement without the aid of the pilot until both arms 45 and 46 are located symmetrically about the axis V—V, and the control surfaces are returned and centered in their original trim setting. When the trim setting of the elevator is such that the center-line V—V is tilted angularly into a position such as indicated by the lines X—Y of Fig. 2, the axis of the spring 36 will be adjusted, together with the centering assembly 20 by means of the push-pull rod 30 to aline with this newly established center line in the following manner:

In flight, the pilot obtains the desired attitude by changing the trim tab setting on the elevator. The movement of the trim tab causes sufficient moment about the elevator hinge line or axis A to change the position of the elevator to the new trimmed position. During this action, the centering device axis is allowed to move with the elevator while the adjustment of the trim tab is taking place; therefore, it is always centered at any trimmed elevator position. If the elevator is pulled off this position by the pilot by means of the elevator control column, and then allowed to return to the trimmed position because of the air loads upon the surface, the air loads will not quite return the elevator to its original trimmed position because of friction within the control system, but will bring the elevator back within the limits of the centering device; and at that point the pre-loaded spring 36 will assist the air loads in overcoming the friction by applying its force through either arm 45 or 46, depending upon its deflected position, and thus bring the elevator completely back to its original trimmed position where the force from the spring 36 is divided equally into arms 45 and 46 resulting in equal and balanced hinge moments about the elevator hinge, but in opposite direction, thus centering the elevator surface. The stick force referred to in the graph shown in Fig. 3 is only that part of the stick force resulting from the spring 36 in the centering device. For illustrative purposes, let us assume that the surface is trimmed at 0 degrees elevator and the pilot has moved the elevator to —18 degrees. Then at —18 degrees, the pin 49 is not in the bottom of the slot 47; therefore no spring force can create any hinge moment. At —15 degrees, the pin 49 is in the bottom of the slot 47 and, through the arm 45, starts to compress the spring 36 from its free-length position, the force to overcome the spring being furnished by the air load tending to return the elevator to its trimmed position—but has been shown on the graph as pilot force. At —4 degrees, the spring has reached its maximum loaded position but due to being on dead-center, no elevator hinge moment is produced. (At this point, the direction of the force has changed and is now assisting the air load in returning the elevator to its trimmed position). At 0 degrees, the spring force is divided equally into the arms 45 and 46. From 0 degrees to plus 4 degrees, the pilot must apply the force to compress the spring through the arm 46. From plus 4 degrees to plus 15 degrees, the spring is assisting the pilot to overcome the air load. At plus 15 degrees, the pin 50 starts to leave the bottom of the slot 48 and the spring has then reached its full free length.

It will be observed from the foregoing description that the present invention provides a particularly simple, yet effective means for centering the elevator, or any of the other control surfaces of the airplane. It will also be noted that the arrangement is one which greatly aids the pilot in maintaining the desired trim of the airplane, and moreover, the force of the operating spring, acting between the articulated centering arms, may be easily overcome by the pilot when manipulating the controls. Accordingly, the present improved centering device makes for greater ease of operation while insuring against drift of the surface from its trimmed or centered position. It also eliminates departure of the airplane from its predetermined course thereby contributing to its efficiency and its flight handling qualities.

It will be understood that while the present invention has been shown and described in conjunction with an aircraft elevator having a trailing edge tab, it is equally adapted for use with the rudder or other control surfaces of the airplane or similar vehicles and whether or not these other surfaces are used in conjunction with tabs of the type which have been shown. It will also be understood that in aircraft having a single central fuselage, such as 10, in Figs. 1 and 2, the elevator 12 will be divided, or in two sections, with one section on each side of the fuselage tail-cone shown in these figures. In such installations the actuating cables 17—18, quadrant 15, centering assembly 20 and its actuating mechanism 30, are all housed within the tail-cone and offer no resistance to the airstream. Similarly in the case of twin-boom or twin-fuselage type aircraft, the mechanism may be faired within either or both of the tail-cones. In these and other installations, it may be desirable to associate the centering assembly directly with the control mechanism in the pilot compartment, or to locate the same at a convenient intermediate point between the pilot compartment and the control surface.

Other forms and modifications of the present invention, both with respect to its general arrangement and the details of its respective parts, are intended to come within the scope and spirit of this invention as more particularly defined in the appended claims.

I claim:

1. Mechanism for centering a movable pivotally mounted member with a normally fixed member mounted on the same pivot, comprising an angularly disposed pair of slotted links apertured for a common pivot at their converging ends and having their slotted ends diverging, a spring-pressed pin mounted upon one of said members and forming the common pivot of said links and a pair of pivots fixed to the other said member engaging the slotted portion of said links for resiliently centering said fixed and movable members from positions of a limited departure of said movable member from its neutral position.

2. In aircraft, centering mechanism for a movable control surface comprising a lever element fixedly attached to the control surface, a sleeve member adjustably rotatable about the axis of rotation of said control surface, means to fix said sleeve member in its adjusted position, said sleeve member including a spring-biased pivot element, and a pair of link elements pivotally mounted upon said spring-biased pivot element at their converging ends and slidably pivoted to said lever element at their diverging ends arranged to resiliently restore said control surface to a neutral position within predetermined angles of departure from the neutral position.

3. In aircraft control systems a movable control surface, actuating means for the rotational movement of said control surface, said control surface having a fixedly attached torque shaft about the axis of which said rotational movements take place, a lever element fixed with respect to said control surface and extending outwardly from said torque shaft, a centering element rotatably and adjustably mounted upon said torque shaft for movement relative to said lever element, means for holding said centering element immovable in its adjusted position and resilient toggle linkage means operatively interconnecting said lever and said rotatable centering elements for resiliently returning said lever element and said control surface to predetermined positions to which said centering element is positioned about said torque shaft within limited angles of departure from a predetermined centered position.

4. In aircraft control surfaces, centering mechanism comprising a lever element fixedly attached to a control surface, a centering element pivotally mounted upon said control surface, mechanism for adjusting said centering member relative to said control surface, means for retaining said centering element in its adjusted position, said centering member having a spring-pressed pivot movably associated therewith, said lever element having a pair of spaced fixed pivots fixedly attached thereto and a pair of slotted link elements pivotally engaging said spring-pressed pivot at their converging terminals and interconnecting said spaced fixed pivots at their diverging slotted portions arranged in such manner that said pivotally interconnected link elements cooperate with said lever element and rotatable member to return said control surface within limited angles of departure from a predetermined centered position and maintain said control surface in such centered position.

5. The combination with an aircraft control surface having a torque tube pivotally mounted upon the aircraft, of an element fixed to and extending radially from the rotatable axis of said torque tube, a pair of fixed pivots carried by said element spaced from the axis of said torque tube and symmetrically disposed about a radial line extending from said torque tube axis, a centering assembly adjustably mounted upon said torque tube including a spring-pressed pin outwardly urged from the axis of said torque tube along a radial line, means for holding said centering assembly in an adjusted position, and a pair of slotted converging links engaging said spring-pressed pin at their apex terminals and slidably engaging said spaced fixed pivots at their diverging slotted terminals whereby said assembly tends to center said control surface for all positions of said spring-pressed pin disposed within the triangle formed by the centers of said spaced fixed pins and the axis of said torque tube, and tends to assist movement of said control surface for all positions of said spring-pressed pin beyond said triangle formed by fixed pivot axes and said torque tube axis.

6. The combination with an aircraft control surface having a torque tube pivotally mounted upon the aircraft, of an element fixed to and extending radially from the rotational axis of said torque tube, a pair of fixed pivots carried by said element spaced from the axis of said torque tube and symmetrically disposed about a radial line extending from said torque tube axis, and a centering assembly adjustably mounted upon said torque tube including a spring-pressed pin outwardly urged from the axis of said torque tube along a radial line, a pair of slotted converging links engaging said spring-pressed pin at their apex terminals and slidably engaging said spaced fixed pivots at their diverging slotted portions whereby said assembly tends to center said control surface for all positions of said spring-pressed pin disposed within the triangle formed by the centers of said spaced fixed pins and the axis of said torque tube and tends to assist movement of said control surface for positions of said spring-pressed pin beyond said triangle formed by said pivot axes and said torque tube axis, and mechanism under the control of the pilot for adjustably positioning and holding said centering assembly in its adjusted position.

7. The combination with an aircraft control surface having a torque tube pivotally mounted upon the aircraft, of a lever element fixed to and extending radially from the rotational axis of said torque tube, a pair of fixed pivots carried by said lever element spaced from the axis of said torque tube and symmetrically disposed about a radial line extending from said torque tube axis, and a centering assembly rotatably mounted upon said control surface including a spring-pressed pin outwardly urged from the axis of said torque tube along a radial line, a pair of slotted converging links engaging said spring-pressed pin at their apex terminals and slidably engaging said spaced fixed pivots at their diverging slotted portions whereby said assembly tends to center said control surface for all positions of said spring-pressed pin disposed within the triangle formed by the centers of said spaced fixed pins and the axis of said torque tube and tends to assist movement of said control surface for positions of said spring-pressed pin beyond said triangle formed by said fixed pivot axes and said torque tube axis, control mechanism operatively associated with said control surface for rotating the same about the axis of said torque tube, and mechanism operatively connected to said centering assembly for adjusting the same about the axis of said torque tube and relative to said control surface.

8. The combination with an aircraft control surface having a torque tube pivotally mounted upon the aircraft, of an element fixed to and extending radially from the rotatable axis of said torque tube, a pair of fixed pivots carried by said element spaced from the axis of said torque tube and symmetrically disposed about a radial line extending from said torque tube axis, and a centering assembly rotatably mounted upon said control surface including a spring-pressed pin outwardly urged from the axis of said torque tube along a radial line, a pair of slotted converging links engaging said spring-pressed pin at their apex terminals and slidably engaging said spaced fixed pivots at their diverging slotted portions whereby said assembly tends to center said control surface for all positions of said spring-pressed pin disposed within the triangle formed by the centers of said spaced fixed pins and the axis of said torque tube and tends to assist movement of said control surface for positions of said spring-pressed pin beyond said triangle formed by said fixed pivot axes and said torque tube axis, a trailing edge tab pivotally mounted upon said control surface, actuating mechanism operatively associated with said control surface for rotating the same about the axis of said torque tube into trim positions of said control surface and said tab, and adjusting and retaining mechanism operatively associated with said centering assembly for follow-up adjustments of said centering assembly to coincident retained positions with said element in the said trim positions arranged in such manner that said control surface and tab are resiliently restored and centered at said predetermined trim positions.

9. Mechanism for centering a movable pivotally mounted control surface with respect to a normally fixed adjustable member comprising a pair of pivots carried by said control surface symmetrically disposed with respect to the axis of the pivotal mounting of said control surface, said pivots being spaced closer to each other than their spacing from said axis, a pivot carried by said adjustable member symmetrically disposed with respect to said first pair of pivots in the centered relationship of said control surface and said member, linkage means including a pair of slotted links interconnecting said member carried pivot with said first pair of pivots and resilient means in engagement with said member-carried pivot for restoring the centered relationship of said control surface and said member within predetermined angles of departure from the said symmetrical disposition of said pivots.

10. Mechanism for automatically positioning a movable pivotally mounted control surface in a predetermined relationship with respect to a normally fixed adjustable member comprising a pair of pivots carried by said control surface spaced from and symmetrically disposed with respect to the axis of the pivotal mounting of said control surface, said pivots spaced closer to each other than either of said pivots is spaced from said axis, a pivot carried by said adjustable member spaced from and symmetrically disposed with respect to said first pair of pivots in the predetermined relationship of said control surface with respect to said member, linkage means including a pair of converging links interconnecting said member-carried pivot with said pair of surface-carried pivots and resilient means urging said member-carried pivot toward said surface-carried pivots for restoring the said predetermined relationship of said control surface and said member within limited angles of departure from the said symmetrical disposition of said pivots.

11. Mechanism for automatically positioning a movable pivotally mounted control surface in a predetermined relationship with respect to a normally fixed adjustable member comprising a pair of pivots actuated by movement of said control surface, said pair of pivots spaced from and parallel to the axis of the pivotal mounting of said control surface, a pivot carried by said adjustable member equidistantly spaced from each pivot of said first pair of pivots in the predetermined relationship of said control surface with respect to said member, linkage means including an angularly disposed pair of slotted links apertured for engagement with said member-carried pivot at their converging ends and having their diverging slotted ends in engagement with said pair of surface-carried pivots, and resilient means urging said member-carried pivot toward said surface-carried pivots for restoring the said predetermined relationship of said control surface and said member within limited angles of departure from the said equidistant disposition of said pivots.

12. Mechanism for automatically centering a movable pivotally mounted control surface with respect to a normally fixed adjustable member pivotally rotatable about the control surface axis, comprising a pair of pivots carried by said control surface spaced from and symmetrically disposed with respect to the axis of the pivotal mounting of said control surface, said pivots spaced closer to each other than either said pivot is spaced from said control surface axis such as to define a triangle therewith, a spring-biased pivot carried by said adjustable member spaced from and symmetrically disposed with respect to said first pair of pivots in the centered relationship of said control surface and said adjustable member, means including a pair of converging links slidably interconnecting said member-carried pivot with said pair of surface-carried pivots for restoring the centered relationship of said control surface and said adjustable member from unsymmetrical dispositions in which said member-carried pivot lies within the triangle formed by said surface pivotal mounting and said pair of surface-carried pivots.

13. Mechanism for automatically positioning a movable pivotally mounted control surface in a predetermined relationship with respect to a normally fixed adjustable member comprising a pair of pivots connected to and arranged to be actuated by movement of said control surface, said pivots spaced closer to each other than either said pivot is spaced from said control surface axis such as to define a triangle therewith, means to move said control surface, a pivot carried by said adjustable member spaced from and symmetrically disposed with respect to said first pair of pivots in the predetermined relationship of said control surface and said member, linkage means including a pair of angularly disposed slotted links interconnecting said member-carried pivot with said pair of control surface-actuated pivots, and resilient means acting upon said member-carried pivot for restoring the predetermined relationship of said control surface and said member within limited angles of departure from the said symmetrical position of said pivots defined by movement of said member-carried pivot within the triangle formed by said pair of pivots and said control surface axis.

14. Mechanism for automatically positioning a movable pivotally mounted control surface in a predetermined relationship with respect to a normally fixed member adjustable about the axis of said control surface pivotal mounting, comprising a pair of pivots connected to and arranged to be actuated by movement of said control surface, said pivots spaced with respect to each other and to said member pivotal axis such as to form a triangle therewith, control means for the movement of said control surface, a pivot movably carried by said adjustable member having its axis parallel to and centrally disposed within the angle formed by the lines connecting each of said pivots of said pair with the axis of pivotal mounting of said member in the predetermined relationship of said control surface and said member, linkage means including a pair of elongated elements interconnecting said member-carried pivot with said pair of control surface-actuated pivots, and resilient means interposed between said member carried pivots and said adjustable member urging said member-carried pivot toward the base of said triangle defined by both of said control surface-actuated pivots for restoring the predetermined relationship of said control surface and said member within limited angles of departure from said predetermined relationship in which said member-carried pivot remains within the said angle formed by said pair of pivots and said member pivotal axis.

15. Mechanism for centering a movable pivotally mounted member with respect to a normally fixed member, both said members pivotally mounted upon a common pivot axis, comprising a pair of angularly disposed link elements each apertured for a common pivot at their converging ends and having their opposite ends diverging, a pin movably mounted upon one of said members and forming the said common pivot of said link elements, resilient means interposed between said common pivot pin and said member upon which said pin is mounted, and a pair of pivots fixed to the other said member engaging the diverging portions of said link elements for resiliently centering said fixed and movable members from positions of a limited departure of said movable member from its neutral position.

16. In aircraft, centering mechanism for a movable control surface comprising a first element fixedly carried by the control surface, a centering member adjustably rotatable about the axis of rotation of said control surface, means to rotate and fix said centering member in its adjusted position about said axis, a spring-biased pivot element resiliently guided within said centering member, and a pair of link elements pivotally mounted upon said spring-biased pivot element at their converging ends and slidably pivoted to said first element at their diverging ends arranged to resiliently restore said control surface to a neutral position upon displacement from the neutral position in either direction.

17. The combination with an aircraft control surface, centering mechanism comprising a centering element pivotally mounted upon said control surface, mechanism for adjusting said centering element relative to said control surface, said centering element having a spring-pressed pivot slidably mounted thereon, a pair of spaced fixed pivots fixedly carried by said control surface, a pair of link elements pivotally engaging said spring-pressed pivot at their converging terminals and interconnecting said spaced fixed pivots at their opposite terminals arranged in such manner that said pivotally interconnected link elements cooperate with said centering element to resiliently oppose displacement of said control surface from its centered position.

LA VERNE E. MAY.

REFERENCES CITED

The following references are of record in the file of this patent:

UNITED STATES PATENTS

| Number | Name | Date |
|---|---|---|
| 1,855,093 | Bruce | Apr. 19, 1932 |
| 1,976,479 | Butler | Oct. 9, 1934 |

FOREIGN PATENTS

| Number | Country | Date |
|---|---|---|
| 569,290 | Great Britain | May 16, 1945 |